Figure 1:
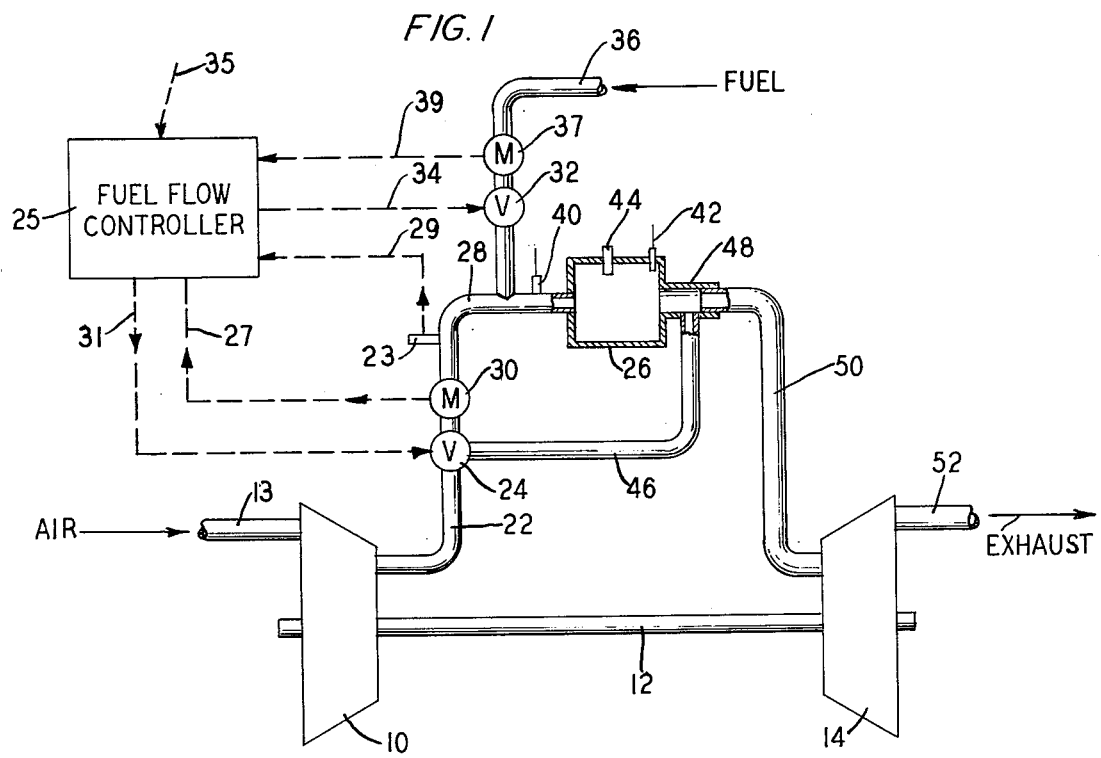

United States Patent [19]

Pfefferle

[11] 4,094,142

[45] June 13, 1978

[54] TURBINE SYSTEM METHOD AND APPARATUS

[75] Inventor: William C. Pfefferle, Middletown, N.J.

[73] Assignee: Engelhard Minerals & Chemicals Corp., Iselin, N.J.

[21] Appl. No.: 724,654

[22] Filed: Sep. 20, 1976

Related U.S. Application Data

[63] Continuation of Ser. No. 519,289, Oct. 30, 1974, abandoned, which is a continuation-in-part of Ser. No. 227,420, Feb. 18, 1972, abandoned.

[51] Int. Cl.² ............................................. F02C 7/22
[52] U.S. Cl. .................................. 60/39.03; 60/39.06; 60/39.23; 60/39.27; 60/39.29
[58] Field of Search ................. 60/39.23, 39.26, 39.27, 60/39.28 T, 39.02–39.06, 39.29, 39.65

[56] References Cited

U.S. PATENT DOCUMENTS

| 3,859,786 | 1/1975 | Azelborn et al. | 60/39.65 |
| 3,921,390 | 11/1975 | Stoltman | 60/39.28 T |

OTHER PUBLICATIONS

Wade et al., "Low Emissions Combustion for Gas Turbines", Journ. of Engr. for Power, Jan., 1974, pp. 32–48.
Azelborn et al., "Low Emissions Combustion", Journ. of Engr. for Power, Jan., 1974, pp. 49–55.

*Primary Examiner*—Robert E. Garrett

[57] ABSTRACT

A method and apparatus for operating a gas turbine system are disclosed utilizing an adiabatic combustion process, employing combustion of a pre-mixed carbonaceous fuel-air admixture in a combustion zone. The combustion and the combustion zone are maintained at an approximately constant temperature by selective control of the fuel-to-air ratio over a period of turbine operation during which the fuel demand or the combustion air temperature varies. Such control of the combustion zone temperature is such that said constant temperature is substantially above the instantaneous auto-ignition temperature of the fuel-air admixture. The resulting effluent is characterized by high thermal energy useful for generating power and may be low in atmospheric pollutants, including oxides of nitrogen.

8 Claims, 2 Drawing Figures

U.S.Patent    June 13, 1978    4,094,142

TURBINE SYSTEM METHOD AND APPARATUS

This application is a continuation of copending application Ser. No. 519,289, filed Oct. 30, 1974, now abandoned, which is a continuation-in-part of application Ser. No. 227,420, filed Feb. 18, 1972, abandoned.

This invention relates to a method and apparatus for obtaining sustained adiabatic thermal combustion of carbonaceous fuels in intimate admixture with combustion air in a turbine system. The term thermal combustion, as used herein and in the appended claims, is understood to mean a homogeneous combustion reaction which proceeds without the aid of a catalyst. The combustion is conducted by utilizing a selectively controlled fuel-to-air ratio to achieve an approximately constant combustion temperature which is substantially above the instantaneous auto-ignition temperature of the fuel-air admixture but preferably is below a temperature that would result in the substantial formation of oxides of nitrogen. Subsequently, additional, selectively controlled air can be combined with the products or effluent from the combustion of the fuel-air admixture. The combustion effluent is characterized by high thermal energy and typically by low nitrogen oxides content. The method and apparatus of this invention thus provide for highly efficient turbine operation and quick response to changes in operation of the system with relatively little atmospheric pollution.

Adiabatic combustion systems, from a practical standpoint, have relatively low heat losses, thus substantially all of the heat released from the combustion zone of such systems appears in the effluent gases as thermal energy for producing power. In general, conventional adiabatic thermal combustion systems operate by contacting fuel and air in inflammable proportions with an ignition source to ignite the mixture which then will continue to burn. Frequently the fuel and air are present in stoichiometric proportions. These conventional systems usually operate at such high temperatures in the combustion zone as to form nitrogen oxides or $NO_x$.

Many thermal combustors employed in turbine systems utilize separate injection of air and fuel into the combustion zone without premixing. Such combustors frequently have a fixed combustor air inlet geometry, so that a predetermined fraction of the inlet air enters the primary or combustion zone and the balance enters the secondary or dilution zone. This allows for variation of the turbine power by adjusting the fuel rate to the combustor and thus varying the temperature of the effluent to the turbine inlet and consequently the turbine power.

Conventional combustors frequently produce high amounts of pollutants because of inefficient combustion. In the type of combustor previously described the fuel delivery system can normally be designed for optimum fuel delivery over only a small portion of the operating range of the combustor. Such narrow limits of most efficient operation tend to produce high levels of CO, unburned hydrocarbons, soot and the like in certain operating modes. For example, at idle conditions the fuel flow may be so low as to result in improper atomization because of low fuel pressure at the fuel nozzle; further, the global air to fuel ratio tends to be relatively high in the combustion zone whenever a decrease in power level occurs because only the fuel flow is decreased while the air flow remains constant for at least a short period of time thereafter. This excess air results in premature quenching which produces CO, unburned hydrocarbons, and the like. For operation above the optimum design limits, the combustion zone tends to operate excessively fuel rich at least in certain random regions, with the result that unburned fuel droplets are coked to make soot and quenched in the dilution zone with high emissions of CO, soot, and unburned hydrocarbons, for example, many commercial aircraft on takeoff operate at such conditions.

Attempts have been made to control the fuel-to-air ratio in conventional combustors. Such attempts, however, have not satisfactorily dealt with the problem of sustained low emission combustion which is responsive to variations in load on the engine and other operating conditions. In fixed geometry conventional combustors which burn fuel in air at approximately the stoichiometric ratio, the hole pattern of the combustor liner is ordinarily designed for best operation of the primary or combustion zone, at nearly full load. As previously discussed, with such apparatus the overall fuel-air ratio decreases at light load or at idle resulting in a leaner mixture in the combustion zone, which can lead to reduced combustion efficiency and increased exhaust emissions. It has been proposed to overcome this problem by using variable combustor geometry to operate the primary or combustion zone at a constant fuel-air ratio, i.e., close to stoichiometric at all turbine operating conditions. Although this does solve the hydrocarbon and carbon monoxide problem, it does not even address the $NO_x$ problem. Formation of $NO_x$ occurs at relatively high temperatures, which inevitably are reached in adiabatic combustion systems with near-stoichiometric fuel-air ratios. Thus simply changing the combustor geometry to maintain near-stoichiometric ratios will not avoid $NO_x$ formation. Further, at a fixed fuel-air ratio the combustion temperature will vary accordingly to variations in the temperature of the air at the inlet to the combustor so that combustion temperature is not fixed.

Flammable mixtures of most fuels, for complete combustion, normally burn at relatively high temperatures, i.e., above about 3300° F which inherently results in the formation of substantial amounts of $NO_x$. In the case of conventional gas turbine thermal combustors, formation of $NO_x$ has been reduced by limiting the residence time of the combustion products in the combustion zone. However, due to the large quantities of gases being handled, undesirable amounts of $NO_x$ are produced. Many conventional combustors, by injecting the fuel into the combustor in droplet form and separately from the air used for combustion present serious drawbacks to low pollution operation. Such a system substantially precludes very lean sustained combustion. Consequently, the combustion temperature of the droplet boundaries will frequently be approximately the theoretical adiabatic flame temperature of a stoichiometric mixture of the fuel and air; this temperature will be substantially over 3,300° F, and typically in excess of 4,000° F. Thus even though the overall temperature in the combustor may be quite low and not high enough to form $NO_x$, the temperature near the droplet surface is typically in excess of that required to form $NO_x$. $NO_x$ thus forms and is present in the combustor effluent.

Broadly, in the present invention intake air is compressed and at least a portion of the compressed air is intimately admixed with a carbonaceous fuel. The resulting admixture is then passed to a temperature controlled combustion or primary zone where it is combusted above the instantaneous auto-ignition temperature at an approximately constant temperature advantageously in the range of about 2,500° to 3,300° F, preferably about 2,800° to 3,300° F, over a period of turbine operation in which the amount of fuel charged to the combustion zone is varied in response to power demand on the turbine. The fuel-to-air volume ratio is adjusted, taking into account the temperature of the gas entering the combustion zone, so that the combustion temperature or theoretical adiabatic flame temperature of the mixture remains about constant over a wide range of fuel inputs. The effluent from the combustion zone is combined in a secondary zone with at least a portion and preferably most of the remaining compressed air charged to the turbine system. The power obtained from the gas turbine can thus be controlled without changing the temperature in the combustion zone by adjusting the overall volume of fuel-air mixture to the combustion zone and the volume of additional or bypass air or gas combined with the combustion effluent. These adjustments regulate the temperature of the gas entering the turbine and thus the power produced thereby. Since the temperature of the combustor effluent-bypass air mixture is primarily dependent on the temperature and relative amounts of combustor effluent and bypass air and since the combustion temperature remains relatively constant, it is possible to obtain a quick response of the gas turbine system to different power requirements by varying the amount of additional or bypass air combined with the combustion effluent. Further, even at low turbine inlet temperatures, low combustion temperatures can be avoided. Thus the combustor need not operate at low temperatures which might impair performance with possible flame-out and also might result in an effluent having a high content of carbon monoxide and hydrocarbons. Similarly, avoidance of combustion temperatures significantly in excess of about 3,300° F avoids the formation of excessive amounts of nitrogen oxides during combustion.

More specifically in this invention intake air is compressed by a compressor turbine, and the compressed air then may be apportioned into at least two parts, one part of which is intimately admixed with a carbonaceous fuel and introduced into a combustion zone to be thermally combusted, preferably by homogeneous thermal combustion and a second part of which is combined with the effluent from such combustion. The relative amount of air in each part or portion is adjustable and proportionately interdependent.

The fuel-air admixture is maintained at about a constant theoretical adiabatic flame temperature by measurement of various parameters and delivery of interdependent amounts of fuel and air which amounts depend on these parameters by employing any convenient means. For instance, air flow metering and temperature sensing means, coupled with a valve or separating means to regulate the air flow to the combustion zone in relation to the fuel flow to the combustion zone, e.g. a venturi meter or like device in combination with a thermocouple and an air flow control valve can be used to determine the amount of air to be admixed with the fuel for a given inlet air temperature. A compressor speed indicator together with a valve position indicator on the air flow valve can alternatively be used in place of the venturi meter. The fuel flow control valve is regulated by a fuel flow controller, based on power requirements of the turbine. The flow of air to the combustor is in turn related to the flow of fuel to the combustor as a function of inlet air temperature to maintain a preselected combustion temperature. The flow and temperature sensors transmit signals related to the volume and temperature of the air to the fuel flow controller. In response to these signals, the fuel flow controller adjusts the air flow control valve to provide a selected amount of air to pass to the system to be admixed with the fuel. Thus, when the amount of fuel passing to the combustion zone is varied, the amount of air to be admixed with the fuel is proportionately varied to maintain a preselected essentially constant temperature in the combustion zone. This operation can, of course, be designed so that the amount of fuel is responsive to the amount of air at a given temperature passed to the combustion zone.

The ratio of fuel to air in the admixture introduced into the combustion zone is ultimately determined by the desired operating temperature of the combustion zone. The operating temperature is determined by the theoretical adiabatic flame temperature of the fuel-air admixture passed to the combustor and thus is dependent on the initial temperature of the air as well as the amount of fuel contained therein.

In the operation of any engine various changes in load occur. For example, increases or decreases in output speed of a turbine may be required thus changing the amount of fuel needed. Further, even at constant speed, load changes are encountered. In certain turbine applications, for example, automobiles, increases or decreases in turbine power often result in an increase or decrease in compressor speed and respectively an increase or decrease in the compression and temperature of the air supplied to the system by the compressor. The theoretical adiabatic flame temperature of an admixture having a given fuel-to-air volume ratio will vary directly with the temperature of the air in the admixture. Thus, for example, as power requirements of the turbine are increased, a number of interrelated control changes must take place; the air charged to the system will be at a higher temperature which, unless compensated for, would increase the adiabatic flame temperature of a given fuel-air mixture. Further, a power increase implies a fuel flow increase; therefore, the portion of the total compressed air which is directed to the combustor must increase to maintain the theoretical adiabatic flame temperature approximately constant. The portion of the total compressed air directed to the bypass will be decreased to allow the temperature of the combined effluent gas-additional air admixture to increase. The relative amounts of each air stream, that is, the air introduced to the combustor and the air directed to the bypass are varied in an inverse manner. These interdependent changes maintain the combustor at an approximately constant temperature by controlling the fuel-air admixture introduced into the combustor to have an approximately constant theoretical adiabatic flame temperature.

The combustion effluent is preferably combined with additional, cooler air to quench the effluent and provide a motive fluid for the gas turbine at a desired temperature. The additional air can be at any convenient temperature, for instance, at about the temperature at which the air leaves the compressor, or it can be at a somewhat lower or higher temperature achieved by, for example, indirect heat exchange with the combustion zone or with the exhaust gases from the turbine. Conveniently, the additional air is at a temperature between about 100 and 2,000° F, and preferably about 500 to 1,500° F. Thus the greater the amount of cooler additional air combined with the combustion effluent, the lower the temperature of the combined gases and, hence, the less the power obtainable from the combined gases when used as a motive fluid in a turbine system. Similarly, if the amount of additional air employed is reduced, the power output from the turbine is increased. The temperature of the combined gases passed to the turbine inlet is generally about 800° to 2,700° F, and preferably for increased turbine efficiency, about 1,100° to 2,700° F. Another means for increasing the energy of the combined combustor effluent-bypass air in response to increased amounts of fuel is to increase proportionately both the amount of air to the combustion zone and the amount of additional air to be combined with the combustion effluent. This can be accomplished by the use of a suitable air flow control device, such as a butterfly valve or a louvered shutter valve or the like, which can regulate the amount of air entering the compressor in relation to the amount of fuel delivered. The combustion effluent will remain at about a constant temperature, and the temperature of the combined gases will remain about the same, because the additional amount of combustion effluent is quenched with a proportionally increased amount of additional air. Since a greater mass of combined gases is produced, the resultant effect is that more power is available to the turbine.

In selected applications, for example turbines with high temperature capabilities, the additional air can be eliminated entirely. In such applications the turbine inlet temperature is constant and is essentially the combustion temperature. In such applications, fuel advantageously can be mixed with air at the inlet to the air compressor or even within the compressor itself.

The method of control utilizing compressor air inlet regulation means is advantageous as the temperature of the combined gas at the turbine inlet will remain constant, thus protecting the turbine against thermal shock and permitting the turbine to operate at a higher efficiency at both low and high loads. The methods outlined employing an intake air regulation means on the air compressor are especially advantageous with turbines which will operate at combustion effluent temperatures, since bypass air then advantageously can be eliminated and control achieved by regulation of the amount of air entering the turbine in response to the fuel, thus taking full advantage of high temperature operation. In certain cases intake air regulation means on the compressor can be combined with an air regulation valve or air separating means in the system downstream of the air compressor to achieve more rapid response and a greater range of power.

A reduction of the power output of a turbine in the system of this invention can be effected in a manner analogous to that previously described by decreasing the total amount of air available or by decreasing the amount of air to the combustion zone while increasing the amount of additional air to be combined with the combustion effluent or by a combination of these changes.

It is readily seen that control of the power output of a turbine as employed in this invention can be achieved by any of several disclosed means or their combination.

In accordance with the invention, combustion is achieved to raise the temperature of an intimate admixture of air and carbonaceous fuel to a temperature of about 2,500° to 3,300° F such temperature being substantially above the instantaneous auto ignition temperature of the fuel-air admixture but below a temperature at which substantial amounts of $NO_x$ are formed. At least a portion of the fuel is combusted under essentially adiabatic conditions. The combustion is thus characterized by the use of a fuel-air admixture having an adiabatic flame temperature substantially above the instantaneous auto ignition temperature of the admixture but below a temperature that would result in any substantial formation of oxides of nitrogen.

The term "instantaneous auto ignition temperature" for a fuel-air admixture as used herein and in the appended claims is defined to mean that temperature at which the ignition lag of the fuel-air mixture entering the combustion zone is negligible relative to the residence time in the combustion zone of the mixture undergoing combustion.

The combustion is achieved by mixing the incoming fuel-air admixture with combustion products at the adiabatic flame temperature of the combustion products. As a result the fresh feed admixture is brought above its instantaneous auto ignition temperature and combusted. Such mixing can be accomplished by any convenient means, for example, by internal recirculation or by a regenerative turbine system to preheat the incoming admixture combined with such internal recirculation. Design of internal recirculation combustors and regenerative turbine systems as well as other applicable systems for accomplishing such combustion are known in the art and details thereof will not be discussed.

As representative of prior art reactors or combustors employing the necessary mixing or recirculation, there may be noted, and incorporated herein by reference, the book, *Combustion in Advanced Gas Turbine Systems*, I. E. Smith, editor, Oxford, England and New York, N.Y., Pergamon Press, Ltd. [1968], pages 12–14. There are discussed on pages 13 and 14 large-scale recirculation obtained by the use of a small number of large jets and small-scale recirculation obtained by the use of a large number of small jets to provide intense mixing, and aerodynamic flow patterns are illustrated on page 12 for large-scale and small-scale mixing. Also incorporated by reference are pages 172, 173 and 177–179 of the book, *Chemical Engineering Kinetics*, by J. M. Smith, New York, N.Y., McGraw-Hill Book Co., Inc., 1956. Stirred-tank reactors are discussed with particular reference to their practical use as allyl chloride gas-phase reactors. It is noted on page 173 that the reaction occurs at a rate determined by the composition close to that of the exit stream from the reactor, and that when mixing actually is complete, the composition in the reactor is the same as that in the exit stream. In the example of a reactor of optimum size for the production of allyl chloride from propylene at a specified feed rate, which starts on page 177, it is stated that "suitable baffles and entrance nozzles will be used so that the contents of the reactor, though gaseous, will be of uniform temperature, pressure, and composition."

To illustrate that methods are well known for the design of steady-state backmix flow reactors, there is incorporated herein by reference pages 102–107 of the book, *Chemical Reaction Engineering; an introduction to the design of chemical reactors*, Octave Levenspiel, New York, New York, John Wiley and Sons, [1962]. On page 102 it is noted that "the composition is uniform through the reactor". An example dealing with reaction rate determination for a gas-phase decomposition reaction taking place isothermally in such a backmix reactor appears on pages 106–107.

The sustained thermal combustion of this invention occurs at a substantially lower temperature than in conventional adiabatic thermal combustion; and therefore, it is possible to operate without formation of significant amounts of $NO_x$.

As previously stated, the adiabatic flame temperature of fuel-air admixtures at any set of conditions (e.g., initial temperature and, to a lesser extent, pressure) is established by the ratio of fuel to air. The proportions of the fuel and air charged to the combustion zone are typically such that there is a stoichiometric excess of oxygen based on complete conversion of the fuel to carbon dioxide and water. Preferably, the free oxygen content is at least about 1.5 times the stoichiometric amount needed for complete combustion of the fuel.

Although the invention is described herein with particularity to air as the nonfuel component, it is well understood that oxygen is the required element to support proper combustion. Where desired, the oxygen content of the nonfuel component can be varied and the term "air" is used herein to refer to the nonfuel components of the admixtures. After start-up the fuel-air admixture fed to the combustion zone may have as low as 10 percent free oxygen by volume or less, which may occur, for example, upon utilization as a source of oxygen a waste stream wherein a portion of this oxygen has been reacted.

The carbonaceous fuels employed may be gaseous or liquid at normal temperature and pressure. Suitable hydrocarbon fuels may include, for example, low molecular weight aliphatic hydrocarbons such as methane, ethane, propane, butane, pentane; gasoline; aromatic hydrocarbons such as benzene, toluene, ethylbenzene, xylene; naphtha; diesel fuel; jet fuel; other middle distillate fuels; hydrotreated heavier fuels; and the like. Among the other useful carbonaceous fuels are carbon monoxide; alcohols such as methanol, ethanol, isopropanol; ethers such as diethylether and aromatic ethers such as ethylphenyl ether. In burning diluted fuels containing inerts, for example, low BTU coal gas, fuel-air admixtures with adiabatic flame temperatures within the range specified herein may be either fuel rich or fuel lean. Where fuel-rich mixtures are utilized, additional air or fuel-air mixtures may be added to the combustion zone effluent to provide an overall excess of air for complete combustion of fuel components to carbon dioxide and water.

In a fuel-rich operation, it is often desirable to employ a fuel-air admixture having at least about 70, and preferably at least about 85 percent by weight of the amount of free oxygen necessary to completely oxidize the fuel to carbon dioxide and water. In fuel rich operation the effluent from the combustion zone is expected to be relatively high in carbon monoxide and hydrocarbon content. The partially oxidized effluent can be admixed with at least a sufficient amount of air to completely combust the effluent to carbon dioxide and water. The mixture of the partially combusted effluent and air can be combusted in a second combustion zone adjacent to the outlet of the primary combustion zone. Advantageously, where practicable, subsequent combustion may partially occur in the turbine blade area. It is also possible to use the partially combusted effluent to power a first turbine and then combust the emanating exhaust gases, with an additional amount of air to reheat the gases to provide power in a second turbine.

The velocity of the fuel-air admixture is generally in excess of the maximum flame propagating velocity upstream of the combustor inlet. Preferably, a flame holder is employed upstream from the combustor. This maintains a flame downstream while preventing passage of the flame upstream. Thus the risk of ignition of the fuel-air admixture prior to the desired point of combustion can be minimized and flashback causing the formation of $NO_x$ can be avoided. Suitable linear gas velocities are usually above about three feet per second, but it should be understood that considerably higher velocities may be required depending upon such factors as temperature, pressure, and composition.

The carbonaceous fuel, which when burned with a stoichiometric amount of air (atmospheric composition) at the combustion inlet temperature usually has an adiabatic flame temperature of at least about 3,300° F, is combusted essentially adiabatically in the combustion zone. The combustion is essentially adiabatic when heat dissipation from the combustion zone decreases the temperature therein by less than about 300° F, and preferably less than about 150° F, below the theoretical adiabatic flame temperature of the fuel-air admixture. Although the instantaneous auto-ignition temperature of a typical fuel may be below about 2,000° F, stable, adiabatic combustion of the fuel below about 3,300° F is extremely difficult to achieve in conventional practical primary combustion systems. It is for this reason that even with gas turbines limited to operating temperatures of 2,000° F, the primary combustion is typically at temperatures in excess of 4,000° F. As stated above, in the present invention, combustion is characterized by employing a fuel-air admixture, having an adiabatic flame temperature substantially above the instantaneous auto-ignition temperature of the admixture but below a temperature that would result in any substantial formation of $NO_x$. The feed to the combustion zone is an intimate admixture of fuel, air, and if desired, inerts. The selection of the adiabatic flame temperature limits is governed largely by residence time and pressure. Generally, adiabatic flame temperatures of the admixtures are in the range of about 2,500° to 3,300° F, and preferably are about 2,800° to 3,300° F based on complete oxidation of the feed to carbon dioxide and water. Operating at a temperature much in excess of 3,300° F results in the significant formation of $NO_x$ even at short contact times; this derogates from the advantages of this invention vis-a-vis a conventional thermal system. A higher temperature within the defined range is desirable, however, because the system will be more stable and thermal reactions at higher temperatures are faster, but the adiabatic flame temperature employed can depend on such factors as the desired composition of the effluent and the overall design of the system. It thus will be observed that a fuel which would ordinarily burn at such a high temperature as to form $NO_x$, is successfully combusted within the defined temperature range without significant formation of $NO_x$. Although combustion occurs adiabatically, it should be understood that for practical operations there may be heat losses to the environment from the combustion zone. A loss in temperature as measured by the effluent temperature may be as much as about 300° F and preferably is not more than about 150° F. Notwithstanding these minor heat losses, the operation from a practical standpoint is considered adiabatic, and the heat of reaction is released primarily in the effluent gases. Thus there may be about four times, preferably at least about seven times, more heat released (thermal energy) in these gases than is lost from the combustion zone.

The combustion zone generally operates at a temperature approximating the theoretical adiabatic flame temperature of the fuel-air admixture charged thereto. These temperatures are usually in the range of about 2,500° to 3,300° F preferably about 2,800° to about 3,300° F. The temperature of the combustion zone is controlled by controlling the combustion of the fuel-air admixture, i.e., its adiabatic flame temperature, as well as the uniformity of the mixture. Relatively higher energy fuels can be admixed with larger amounts of air in order to maintain the desired temperature in the combustion zone. At the higher end of the temperature range, shorter residence times of the gas in the combustion zone appear to be desirable in order to lessen the chance of forming $NO_x$. The residence time is governed largely by temperature, sufficient mixing of combusted effluent and fresh feed, pressure and space throughput, and generally is measured in milliseconds. The residence time of the gases in the combustion zone and any subsequent thermal combustion zone may be below about 0.1 second, preferably below about 0.05 second. The gas space velocity may often be, for example, in the range of about 0.1 to 1 or more million cubic feet of total gas (standard temperature and pressure) per cubic foot of total combustion zone per hour. For a stationary turbine burning diesel fuel, typical residence time could be about 30 milliseconds or less; whereas in an automotive turbine engine burning gasoline, the typical residence time may be about 5 milliseconds or less. The total residence time in the combustion system should be sufficient to provide essentially complete combustion of the fuel, but not so long as to result in the formation of $NO_x$.

In order to improve the thermal efficiency of the overall system, the air, and even the fuel, may be heated before being passed into the combustion zone. The fuel-air admixture for a nonregenerative turbine at full speed typically may have a temperature of at least about 400° F, and for a regenerative turbine typically of about 1,000° F, before introduction into the combustion zone. Usually there is no need to preheat the fuel-air admixture above about 1,500° F, and for example, internal recirculation in the combustion zone serves to bring the temperature of the inlet gases from below the instantaneous auto-ignition temperature to the operating temperature, i.e., about 2,500° to 3,300° F.

The turbine system of the present invention will be further described in connection with the drawings in which:

FIG. 1 is a schematic diagram illustrating the operation of this invention in an embodiment having a compressor 10, combustor 26, and a turbine 14.

Figure 2:
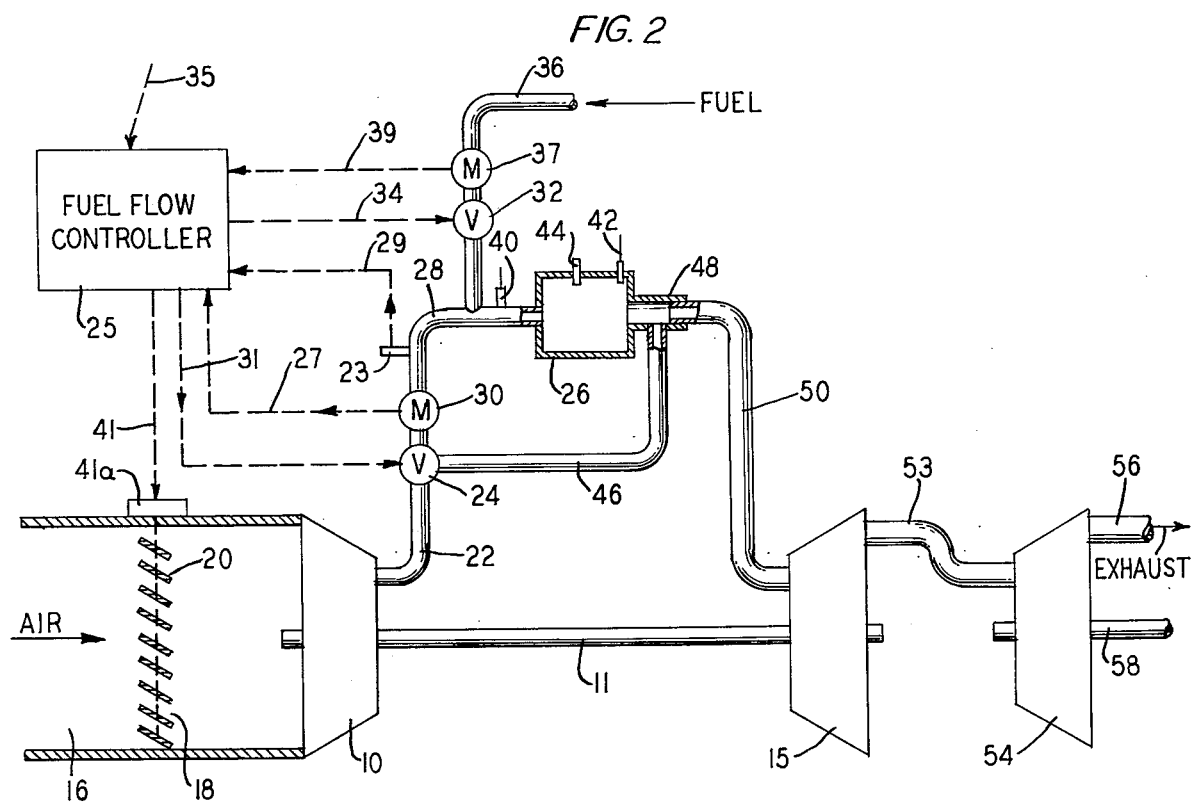

FIG. 2 is a schematic diagram illustrating the operation of this invention with an embodiment having a compressor 10, a combustor 26, a free turbine 15, and a power turbine 54.

With reference to FIG. 1, the air compressor 10 is driven by a rotatable power shaft 12 which is propelled by turbine 14. The shaft 12 can be connected to any suitable power transmission system to use the power imparted to the shaft by the turbine 14. Thus turbine 14 may be employed to operate an electrical generator, or an automotive vehicle through an automatic transmission. Turbine 14 may, for example, be a high compression turbine having a compression ratio of 10:1. Turbines generally have compression ratios of at least about 2:1 and typically at least about 5:1 causing combustion to occur at elevated pressures relative to ambient pressure. The compression ratios referred to are the approximate number of atmospheres under which combustion takes place. Automotive vehicles will generally have a turbine with a compression ratio of about 5:1 indicating that combustion at the rated speed takes place at about 75 psia when ambient air is at about one atmosphere. The structure, operation, and control of turbines are known in the art; details in this regard will be omitted from this description since they are unnecessary to explain the present invention.

Intake air is admitted to intake line 13 and is compressed in the air compressor 10. The compressed air passes through line 22 to air portioning valve 24 where the air is divided into one portion to be admixed with the fuel and a second portion to be combined with the combustion effluent.

The portion of the compressed air to be admixed with the fuel passes from air portioning valve 24 through line 28 and orifice meter 30 located thereon and into contact with thermocouple 23 located on line 28 and then to the combustor 26. The orifice meter 30 measures the volume and the thermocouple 23 measures the temperature of air passing through line 28. The amount of fuel entering the combustor through fuel line 36 is measured by fuel flow meter 37 located thereon. This amount is regulated by the fuel supply control valve 32 which is also located on line 36. A fuel flow controller 25 is provided to respond to power requirements through demand input means 35 which demand means 35 is in turn responsive to a source not shown such as manual control or a governor or the like. The controller 25 is operative on fuel supply control valve 32 and air portioning valve 24 through output linkages 34 and 31 respectively. The controller 25 in addition to being responsive to demand input means 35 is also responsive to volume measurement signals from meters 30 and 37 and temperature measurement signals from thermocouple 23 through input linkages 27, 39, and 29 respectively. Thus, the relative amount of air passing through air portioning valve 24 into line 28 to the amount of fuel passing through fuel supply control valve 32 to be admixed with such air in line 28 is controlled to maintain a relatively constant adiabatic flame temperature in combustor 26.

Since the fuel-air mixture is in or passes through the inflammable range, a gas velocity above the flame propagating velocity of the particular fuel-air mixture upstream of the combustor 26 inlet is used to insure against flaming and possible detonations. The fuel-air admixture charged to the combustor 26 at this velocity is then brought above its instantaneous auto-ignition temperature by the internal recirculation system of combustor 26. A thermocouple 40 is positioned at the combustor 26 inlet to measure the temperature of the combustor at this location. A thermocouple 42 is located at the combustor 26 outlet to determine the temperature of the effluent gases.

During start-up of the combustion system, fuel and air can be introduced into the combustor 26 in an amount regulated by air portioning valve 24 and fuel supply control valve 32 to provide an inflammable mixture at a velocity below the maximum flame propagation velocity at the conditions of start-up. The fuel-air admixture can be ignited by igniter 44 and burned under flaming conditions until the combustor 26 is at a temperature sufficient to sustain combustion when igniter 44 is shut down. When operation of the combustor has been established, the igniter 44 can be incapacitated and valves 24 and 32 adjusted to a normal controlled temperature operating position. The velocity of the fuel-air mixture upstream of the combustor 26 is then maintained above the maximum flame propagating velocity of the mixture to prevent flashback.

The second portion of the compressed air from the air portioning valve 24 is passed through line 46 to a secondary zone or mixing chamber 48 which is adjacent to the outlet of the combustor 26. In mixing chamber 48, the second portion of air or additional air is combined with the effluent gases passing from combustor 26 to provide a cooler motive fluid for operating the turbine 14. The combined gases then pass through line 50 to the turbine 14 wherein they are employed to power the turbine 14 and impart rotary motion to shaft 12. The exhaust from the turbine 14 is released from the system through line 52.

An operational change in the turbine system as depicted in FIG. 1 can be effected in the following manner. For example, if an increase in turbine power output is desired, the demand input means 35 is adjusted to require such increase from controller 25. In response to controller 25 fuel regulating valve 32 will increase the amount of fuel and air portioning valve 24 will increase the amount of air in the proper proportion to maintain a constant adiabatic flame temperature of the mixture passing to combustor 26. The controller 25 monitors the process to maintain a relatively constant adiabatic flame temperature of the mixture in response to signals from meters 30 and 37 and thermocouple 23. Therefore, the fuel-air mixture is combusted and exits the combustor 26 at approximately the same temperature as that exhibited by the combustion effluent prior to the change in the conditions of the system.

Since a greater portion of the air charged to the combustion system has been directed by valve 24 to pass through line 28 to the combustor 26, a correspondingly lesser amount of air passes vial line 46 to be admixed with the combustor effluent in mixing chamber 48. The combined gases passing by line 50 to the turbine 14 are necessarily at a higher temperature due to the increased mass of the combustor effluent and the decreased mass of additional air. Thus the heat content of the motive gases to the turbine 14 is increased, allowing an increased power output yet maintaining an approximately constant temperature in the combustor 26.

FIG. 2 depicts another embodiment of the turbine system of the present invention which is particularly adaptable for use in automobiles in which considerable periods of operating time are spent idling or undergoing speed changes. The turbine system of FIG. 2 is similar in nature to the system of FIG. 1 and the same members are designated by like numbers in each. In the system of FIG. 2, however, the intake air enters the turbine system through air inlet 16. An air flow regulation valve 18 comprised of adjustable louvers 20 is located within the air inlet 16 to control the amount of air passing to the turbine system. Valve 18 is responsively connected to input power demand 35 either directly, not shown, or through regulator 41A, linkage 41 and controller 25, as shown. The system operates in the same manner as that of FIG. 1 except that the additional variable of total air flow control is introduced. The air after passing through air inlet 16 and air flow regulation valve 18 passes to the compressor 10 and is compressed for use in the combustion system as previously described. The effluent from the system, after being combined with the additional air in the secondary zone or mixing chamber 48, is used to power the free turbine 15 which in turn drives air compressor 10 via shaft 11. The free turbine 15 can be maintained at a constant speed if desired by utilization of a governor, for example, a device to change the pitch and/or opening of the turbine nozzles. The exhaust from free turbine 15 is passed through line 53 and introduced into power turbine 54 which drives power shaft 58. Power shaft 58 can be connected to any suitable power transmission system to utilize the power imparted to the shaft 58 by turbine 54.

The combined gases thus enter free turbine 15 at about a constant, desired temperature, and free turbine 15 draws sufficient energy from the gases to power air compressor 10. The exhaust of free turbine 15 is used as the motive fluid for power turbine 54. When the turbine system is at idle, the air intake control valve 18 is nearly closed, i.e., louvers 20 are nearly in a shut position. The power utilized by the operation of the free turbine 15 leaves the motive fluid with insufficient power to run the power turbine 54. As the air intake control valve 18 is opened, a greater amount of air enters the system. The air portioning valve 24 allows a proportionately larger amount of air to pass to the combustor 26. The controller 25 monitors meters 30 and 37 and thermocouple 23 to maintain a constant adiabatic flame temperature of the fuel-air admixture.

The turbine control system of FIG. 2 can be used with the single shaft turbine of FIG. 1 as well as other turbines; similarly, the system of FIG. 1 can be used with the free turbine design of FIG. 2.

The following examples will more fully illustrate the embodiments of this invention, in particular the method of controlling the temperature in a combustion zone at an approximately constant value wherein the combustion zone employs combustion of carbonaceous fuels in order to obtain an effluent containing very small amounts of hydrocarbons, carbon monoxide and nitrogen oxides. All proportions referred to herein and in the appended claims are by weight unless otherwise indicated.

EXAMPLE 1

A turbine is operated in accordance with the turbine system schematically depicted in FIG. 1. Air is compressed and passed into the system at the rate of about 0.8 pounds per second. The compressed air is preheated to about 600° F. Approximately 0.4 pounds per second of the compressed air is admixed with sufficient naphtha so that the mixture will exhibit a theoretical adiabatic flame temperature of about 3,200° F.

The fuel-air mixture is combusted. The effluent from the combustion zone is at a temperature of about 3,100° F. The effluent is combined with 0.4 pounds per second of the preheated additional air and the temperature of the motive fluid to the turbine is 1,900° F. The turbine is at part power with a motive fluid at this temperature. An operational change in the turbine system is introduced by passing 0.5 pounds per second of air to be admixed with the fuel. The combustion effluent is still at a temperature of 3,100° F. Additional air in the amount of 0.3 pounds per second combined with the combustion effluent to produce a turbine motive fluid at a temperature of about 2,200° F.

EXAMPLE 2

Commercial unleaded gasoline is utilized in a turbine operated in accordance with the turbine system of this invention schematically depicted in FIG. 2. The fuel rate is 67 pounds per hour and the amount of combustion air is controlled at 2,150 pounds per hour by means of the air flow control valve. The nominal velocity of the compressed air is 40 feet per second. The combustor inlet temperature of the fuel-air mixture is 690° F, the combustion temperature is 2,600° F, and the amount of dilution air is such as to produce a temperature of 1,700° F in the combined effluent. The combined effluent from the dilution zone is allowed to expand in a turbine to produce rotating motion and exhausted through a test chamber to determine pollutant content. The combustion temperature is maintained approximately constant at about 2,600° F and it is found that the effluent is low in pollutants. Power is increased by increasing air flow to 6,000 pounds per hour by adjusting the air flow control valve. Fuel flow increases proportionately to 186 pounds per hour to maintain combustion zone temperature constant. The ratio of dilution air to combustion air is held constant as are the combustor outlet and dilution zone effluent temperatures. The effluent is again low in pollutants.

EXAMPLE 3

Unleaded commercial gasoline is utilized in a turbine in a manner identical with that of EXAMPLE 2, except that the air separating means is adjustable. The fuel rate is 115 pounds per hour and the amount of combustion air is 4,000 pounds per hour delivered at a nominal air velocity of 35 feet per second at the combustor inlet. The temperature of the fuel-air mixture at the inlet to the combustor is 810° F. The temperature in the combustion zone is 2,900° F, and sufficient dilution air is added to the effluent from the combustor to produce a temperature of 2,100° F. The combined effluent from the dilution zone is allowed to expand in a turbine to produce rotating motion and is then exhausted through a test chamber as in EXAMPLE 2. The power is decreased by reducing the total air flow to the compressor by means of the air flow controller to 3,000 pounds per hour and the amount of air to the combustor in relation to the amount of air to the dilution zone is decreased to result in a dilution zone effluent temperature of 1,900° F with the fuel flow adjusted to maintain the combustion zone temperature at 2,900° F. Effluent pollutant levels are similar to those of EXAMPLE 2.

What is claimed is:

1. A method for operating a gas turbine by combusting carbonaceous fuel which when burned with a stoichiometric amount of air has an adiabatic flame temperature of at least about 3,300° F, comprising:
   (a) forming an intimate admixture of air and an amount of the fuel to maintain a constant fuel-to-air volume ratio;
   (b) introducing said admixture into a combustion zone wherein combustion is proceeding with formation of combustion products in the combustion zone;
   (c) mixing said fuel-air admixture with combustion products so formed to bring said admixture above its instantaneous auto-ignition temperature within said combustion zone, thereby thermally combusting the fuel-air admixture at an approximately constant temperature in the range of about 2,500° to about 3,300° F over a period of turbine operation in which the amount of fuel introduced into the combustion zone is varied, the velocity of the fuel-air admixture for combustion being above the maximum flame-propagating velocity of the admixture at or upstream of the inlet to the combustion zone;
   (d) simultaneously removing combustion products from said combustion zone;
   (e) combining a sufficient amount of cooler, additional air with the combustion products so removed to provide a combined gas wherein the temperature of the combined gas is essentially constant over a period of turbine operation in which the amount of fuel introduced into the combustion zone is varied; and
   (f) passing the combined gas to a turbine as a motive fluid.

2. A method for operating a gas turbine by combusting, over a period of operation of said turbine during which variations occur in the fuel demand or in the combustion air temperature, carbonaceous fuel which when burned with a stoichiometric amount of air has an adiabatic flame temperature above about 3,300° F, comprising:
   (a) forming an intimate admixture of said fuel and said combustion air, while controlling the ratio of said fuel to said combustion air in said admixture to maintain the adiabatic flame temperature of said admixture, despite said variations, at about a preselected value in the range of about 2,500° to about 3,300° F;
   (b) introducing said admixture into a combustion zone wherein combustion is proceeding under essentially adiabatic conditions with formation of combustion products in the combustion zone;
   (c) mixing said fuel-air admixture with combustion products so formed to bring said admixture above its instantaneous auto-ignition temperature within said combustion zone, thereby combusting the fuel-air admixture at an approximately constant temperature in the range of about 2,500° F to about 3,300° F over a period of turbine operation in which the rate of introducing fuel into the combustion zone is varied, the velocity of the fuel-air admixture for combustion being above the maximum flame-propagating velocity of the admixture at or upstream of the inlet to the combustion zone;
   (d) simultaneously removing combustion products from said combustion zone;
   (e) combining a sufficient amount of cooler, additional air with the combustion products so removed to provide a combined gas at a substantially lower temperature, wherein the temperature of the combined gas is maintained essentially constant at a temperature within the range of about 1,100° to about 2,700° F over a period of turbine operation in which the amount of fuel introduced into the combustion zone is varied; and
   (f) passing the combined gas to a turbine as a motive fluid.

3. A turbine system comprising:
   (a) an air compressor;
   (b) intake range regulation means connected to the air compressor for controlling the amount of air available to the air compressor;
   (c) means for receiving compressed air from the air compressor and separating the air into a first portion and a second portion;
   (d) a metering means operationally connected to the separating means to measure the flow rate of air in the first portion;

(e) a fuel regulating means which communicates with the metering means for the first portion of air to allow an amount of fuel necessary to provide about a constant volume ratio of fuel to the first portion of air;
(f) a fuel mixing zone which receives the first portion of air and the fuel;
(g) a combustor which receives and combusts the fuel-air mixture from the mixing zone;
(h) a subsequent mixing zone which receives and combines combustor effluent and the second portion of air;
(i) a turbine; and
(j) a means for supplying the combined mixture from the subsequent mixing zone to the turbine.

4. A turbine system comprising:
(a) a gas turbine;
(b) an air compressor having an air inlet;
(c) intake air regulation means, connected to the inlet of said compressor, for controlling the amount of air delivered to said compressor responsive to power requirements of the turbine;
(d) separating means, selectively capable of responding to power requirements of said turbine, for receiving compressed air from said compressor and selectively capable of separating said compressed air into at least a first portion and a second portion;
(e) metering and temperature sensing means for measuring the flow rate and temperature of air in at least said first portion of compressed air, selectively operationally connected to said separating means;
(f) fuel regulating and delivering means, responsive to power requirements of said turbine, communicating with said metering and temperature sensing means to deliver an amount of fuel necessary to provide a selected ratio of fuel to at least said first portion of air;
(g) a first mixing zone which receives at least said first portion of air and said fuel and provides an intimate admixture thereof;
(h) a combustor to receive and combust said intimate admixture from said first mixing zone to provide a combustion effluent of high thermal energy;
(i) a second mixing zone adapted to receive said combustion effluent and said second portion of compressed air, and capable of providing a second zone effluent in the form of a mixture of said combustion effluent and said second portion of compressed air; and
(j) means for supplying said second zone effluent to said turbine.

5. A method for operating a gas turbine by combusting, over a period of operation of said turbine during which variations occur in the fuel demand or in the combustion air temperature, a carbonaceous fuel which when burned with a stoichiometric amount of air has an adiabatic flame temperature above about 3,300° F, comprising:
(a) forming an intimate admixture of said fuel and said combustion air,
(b) while controlling the ratio of said fuel to said combustion air in said admixture to maintain the adiabatic flame temperature of said admixture, despite said variations, at about a preselected value in the range of about 2,500° F to about 3,300° F;
(c) introducing said admixture into a combustion chamber wherein combustion is proceeding under essentially adiabatic conditions with formation of combustion products in the combustion zone;
(d) mixing said incoming fuel-air admixture with combustion products substantially at the adiabatic flame temperature reached upon combustion of said admixture to bring substantially every volume element of said admixture by said mixing above its instantaneous auto-ignition temperature, whereby combustion of the fuel-air admixture is achieved under essentially adiabatic conditions at a temperature maintained with the range of about 2,500° to about 3,300° F over a period of turbine operation in which the amount of fuel introduced into the combustion chamber is varied;
(e) simultaneously removing combustion products at a temperature within said range from said combustion chamber;
(f) combining an amount of cooler, additional air with the combustion products so removed at a rate of combining said additional air with said combustion products which is increased sufficiently as said fuel demand increases, and which is decreased sufficiently as said fuel demand decreases, to maintain the combined gas at an essentially constant, substantially lower temperature, within a range of about 1,100° to about 2,700° F, over a period of turbine operation in which the F, of fuel introduced into the combustion chamber is varied; and
(g) passing said combined gas at said essentially constant temperature to a turbine as a motive fluid.

6. The method as defined in claim 5 wherein said adiabatic flame temperature of said incoming fuel-air admixture is about 2,800° to about 3,300° F.

7. The method as defined in claim 5 wherein said incoming fuel-air admixture contains at least about 1.5 times the stoichiometric amount of oxygen based on complete combustion of said fuel.

8. The method of claim 5 wherein, in controlling the ratio of fuel to air to maintain said adiabatic flame temperature of said incoming fuel-air admixture at about preselected value, the feeding of the fuel and of the combustion air to form said intimate admixture are simultaneously and continuously regulated in response to variations in said fuel demand and in the air inlet temperature.

* * * * *